(12) United States Patent
Nomura et al.

(10) Patent No.: US 9,033,840 B2
(45) Date of Patent: May 19, 2015

(54) SPEED REDUCTION MECHANISM AND MOTOR TORQUE TRANSMISSION APPARATUS INCLUDING THE SAME

(71) Applicant: JTEKT Corporation, Osaka-shi (JP)

(72) Inventors: Keita Nomura, Kariya (JP); Kunihiko Suzuki, Gamagori (JP); Hiroshi Takuno, Nukata-gun (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/933,449

(22) Filed: Jul. 2, 2013

(65) Prior Publication Data

US 2014/0018202 A1 Jan. 16, 2014

(30) Foreign Application Priority Data

Jul. 11, 2012 (JP) ................................ 2012-155818

(51) Int. Cl.
| | |
|---|---|
| *F16H 48/30* | (2012.01) |
| *F16H 1/32* | (2006.01) |
| *B60K 1/00* | (2006.01) |
| *B60K 17/356* | (2006.01) |

(52) U.S. Cl.
CPC ........ *F16H 1/32* (2013.01); *F16H 48/30* (2013.01); *B60K 1/00* (2013.01); *B60K 2001/001* (2013.01); *F16H 2001/325* (2013.01); *B60K 17/356* (2013.01)

(58) Field of Classification Search
None
See application file for complete search history.

(56) References Cited

U.S. PATENT DOCUMENTS

| | | | |
|---|---|---|---|
| 6,761,660 B2 * | 7/2004 | Lim ................................ | 475/179 |
| 2003/0054912 A1 | 3/2003 | Nohara et al. | |
| 2005/0006164 A1 * | 1/2005 | Teraoka ......................... | 180/243 |
| 2007/0015619 A1 * | 1/2007 | Sasahara et al. ............... | 475/178 |
| 2008/0188343 A1 * | 8/2008 | Pan et al. ....................... | 475/230 |
| 2011/0182735 A1 | 7/2011 | Kodama | |
| 2012/0238393 A1 * | 9/2012 | Martin, III ..................... | 475/220 |
| 2013/0143707 A1 | 6/2013 | Suzuki et al. | |

FOREIGN PATENT DOCUMENTS

| | | |
|---|---|---|
| EP | 1 296 084 A2 | 3/2003 |
| EP | 2 330 297 A1 | 6/2011 |
| FR | 2 330 557 | 6/1977 |
| GB | 1 559 276 | 1/1980 |
| JP | 2007-218407 | 8/2007 |
| WO | WO 2007/097085 A1 | 8/2007 |

OTHER PUBLICATIONS

U.S. Appl. No. 13/850,393, filed Mar. 26, 2013, Takuno, et al.
Extended European Search Report issued Oct. 15, 2013, in Patent Application No. 13175238.8.

* cited by examiner

*Primary Examiner* — Derek D Knight
*Assistant Examiner* — Timothy Hannon
(74) *Attorney, Agent, or Firm* — Oblon, McClelland, Maier & Neustadt, L.L.P.

(57) ABSTRACT

A speed reduction mechanism includes a bearing mechanism arranged on an axis of an output mechanism and including ball bearings that are arranged in parallel with each other in an axial direction of a differential case. The differential case is rotatably supported by the ball bearings of the bearing mechanism such that the entirety of an outer periphery of one of the ball bearings faces an inner periphery of a first housing element that accommodates the differential case and that is made of a material having a stiffness lower than a stiffness of a material of a rotation force applying member, and the entirety of an outer periphery of the other one of the ball bearings faces an inner periphery of the rotation force applying member.

9 Claims, 5 Drawing Sheets

The modified example
FIG.5

SPEED REDUCTION MECHANISM AND MOTOR TORQUE TRANSMISSION APPARATUS INCLUDING THE SAME

INCORPORATION BY REFERENCE

The disclosure of Japanese Patent Application No. 2012-155818 filed on Jul. 11, 2012 including the specification, drawings and abstract is incorporated herein by reference in its entirety.

BACKGROUND OF THE INVENTION

1. Field of the Invention

The invention relates to a speed reduction mechanism that is suitable for use in, for example, an electric vehicle including an electric motor as a drive source, and also relates to motor torque transmission apparatus including the speed reduction mechanism.

2. Description of Related Art

A conventional motor torque transmission apparatus includes an electric motor and a reduction-transmission mechanism. The electric motor generates motor torque. The reduction-transmission mechanism transmits driving force based on the motor torque of the electric motor, to a differential mechanism. The motor torque transmission apparatus is installed in, for example, an automobile (refer to, for example, Japanese Patent Application Publication No. 2007-218407 (JP2007-218407 A)).

The electric motor has a motor shaft that is rotated by electric power from an onboard battery. The electric motor is arranged on the axis of the reduction-transmission mechanism.

The reduction-transmission mechanism has a shaft portion (rotary shaft with eccentric portions) and a pair of reduction-transmission portions. The shaft portion is spline-fitted to the motor shaft of the electric motor. The reduction-transmission portions are arranged around the rotary shaft with the eccentric portions. The reduction-transmission mechanism is interposed between the electric motor and the differential mechanism (differential case). Further, the reduction-transmission mechanism is coupled to the motor shaft and the differential case. Moreover, the reduction-transmission mechanism is accommodated in a housing together with the electric motor and the differential mechanism.

With the configuration as described above, the motor shaft of the electric motor is rotated by electric power from the onboard battery, and as a result, motor torque is transmitted from the electric motor to the differential mechanism via the reduction-transmission mechanism, and is then distributed to right and left wheels by the differential mechanism.

The reduction-transmission portions of the motor torque transmission apparatus of the above-mentioned type include a pair of disc-shaped revolving members, a plurality of outer pins and a plurality of inner pins. The revolving members make revolving motions in accordance with rotation (rotation of the rotary shaft with the eccentric portions) of the motor shaft of the electric motor. The outer pins apply rotation force to the revolving members. The inner pins arranged radially inward of the outer pins output the rotation force of the revolving members in the form of torque, to the differential mechanism.

Each of the revolving members has a center hole and a plurality of pin insertion holes. The center hole opens toward both sides in the direction of its central axis. The pin insertion holes are arranged around the central axis of the center hole at equal angular intervals. The revolving members are rotataby supported on the eccentric portions of the rotary shaft with the eccentric portions, via bearings (cam-side bearings).

The outer pins are arranged around the axis of the motor shaft at equal angular intervals. Further, the outer pins are fitted to a housing of the reduction-transmission mechanism.

The inner pins are extended through the pin insertion holes of the revolving members. The inner pins are arranged around the axis of the motor shaft at equal angular intervals. Further, the inner pins are fitted to the differential case. Bearings (pin-side bearings) are fitted to the inner pins. The bearings are used to reduce contact resistance between the inner pins and the inner peripheries of the revolving members, which define the pin insertion holes.

In the motor torque transmission apparatus described in JP 2007-218407 A, a plurality of the outer pins needs to be prepared, and further, the outer peripheral portions of the revolving members need to be formed into a complex shape, which is uneconomical.

To avoid such a problem, external gears may be employed as the revolving members, an internal gear may be employed as the rotation force applying member that applies rotation force to the revolving members, and the number of teeth of the internal gear may be set larger than that of each external gear.

However, when the reduction-transmission mechanism including the external gears and the internal gear is used in motor torque transmission apparatus for an automobile, if a load caused by a centrifugal force is exerted on a differential mechanism-side end portion of the motor shaft (rotary shaft) from the external gears during output of the power, the rotary shaft may be slanted or runout of the rotary shaft may occur. If the rotary shaft is slanted or runout of the rotary shaft occurs, the external gears are meshed with the internal gear while being slanted, and therefore, off-center between the internal gear (rotation force applying member) and the output target is caused, resulting in hindrance to smooth rotation of the differential case.

SUMMARY OF THE INVENTION

One object of the invention is to provide a speed reduction mechanism configured such that occurrence of off-center between an internal gear (rotation force applying member) and an output target is suppressed, and motor torque transmission apparatus including the speed reduction mechanism.

An aspect of the invention relates to a speed reduction mechanism, including: a rotary shaft with an eccentric portion; an input member that is an external gear rotatably arranged on an outer periphery of the eccentric portion of the rotary shaft and having a plurality of through-holes arranged around an axis of the input member at equal angular intervals; a rotation force applying member that is an internal gear meshed with the input member and having teeth of which the number is larger than the number of teeth of the external gear; an output mechanism having a plurality of output members that receive rotation force applied to the input member by the rotation force applying member and output the rotation force to an output target as torque of the output target, and that are passed through the respective through-holes; and a bearing mechanism arranged on an axis of the output mechanism and including a pair of rolling bearings that are arranged in parallel with each other in an axial direction of the output target. The output target is rotatably supported by the rolling bearings of the bearing mechanism such that an outer periphery of one of the rolling bearings faces an inner periphery of a housing that accommodates the output target and that is made of a material having a stiffness lower than a stiffness of a material of the rotation force applying member, and at least part of an outer periphery of the other one of the rolling bearings faces an inner periphery of the rotation force applying member.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 4A and FIG. 4B are enlarged sectional views illustrating main portions (a portion M and a portion N in FIG. 2) of the motor torque transmission apparatus according to the embodiment of the invention, wherein FIG. 4A illustrates the portion N in FIG. 2 and FIG. 4B illustrates the portion M in FIG. 2.

DETAILED DESCRIPTION OF EMBODIMENTS

Hereinafter, a speed reduction mechanism and motor torque transmission apparatus including the speed reduction mechanism, according to an embodiment of the invention will be described in detail with reference to the accompanying drawings.

Figure 1:
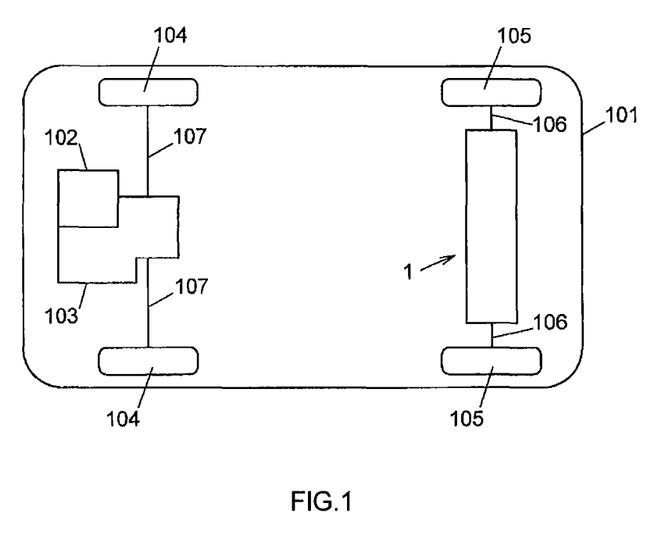
FIG. 1 is a plan view schematically illustrating a vehicle that includes motor torque transmission apparatus according to an embodiment of the invention.

FIG. 1 schematically shows a four-wheel-drive vehicle 101. As shown in FIG. 1, the four-wheel-drive vehicle 101 includes a front wheel-side power system and a rear wheel-side power system. The front wheel-side power system has an engine as a drive source. The rear wheel-side power system has an electric motor as a drive source. The four-wheel-drive vehicle 101 includes motor torque transmission apparatus 1, an engine 102, a transaxle 103, a pair of front wheels 104 and a pair of rear wheels 105.

The motor torque transmission apparatus 1 is arranged in the rear wheel-side power system in the four-wheel-drive vehicle 101, and is supported on a vehicle body (not shown) of the four-wheel-drive vehicle 101.

The motor torque transmission apparatus 1 transmits driving force based on motor torque from an electric motor 4 (described later) to the rear wheels 105. Thus, the motor torque of the electric motor 4 is output to rear axle shafts 106 (the rear wheels 105) via a reduction-transmission mechanism 5 and a rear differential 3 (both will be described later), thereby driving the rear wheels 105. The motor torque transmission apparatus 1 and other components will be described later in detail.

The engine 102 is arranged in the front wheel-side power system in the four-wheel-drive vehicle 101. Thus, driving force from the engine 102 is output to front axle shafts 107 (the front wheels 104) via the transaxle 103, thereby driving the front wheels 104.

Figure 2:
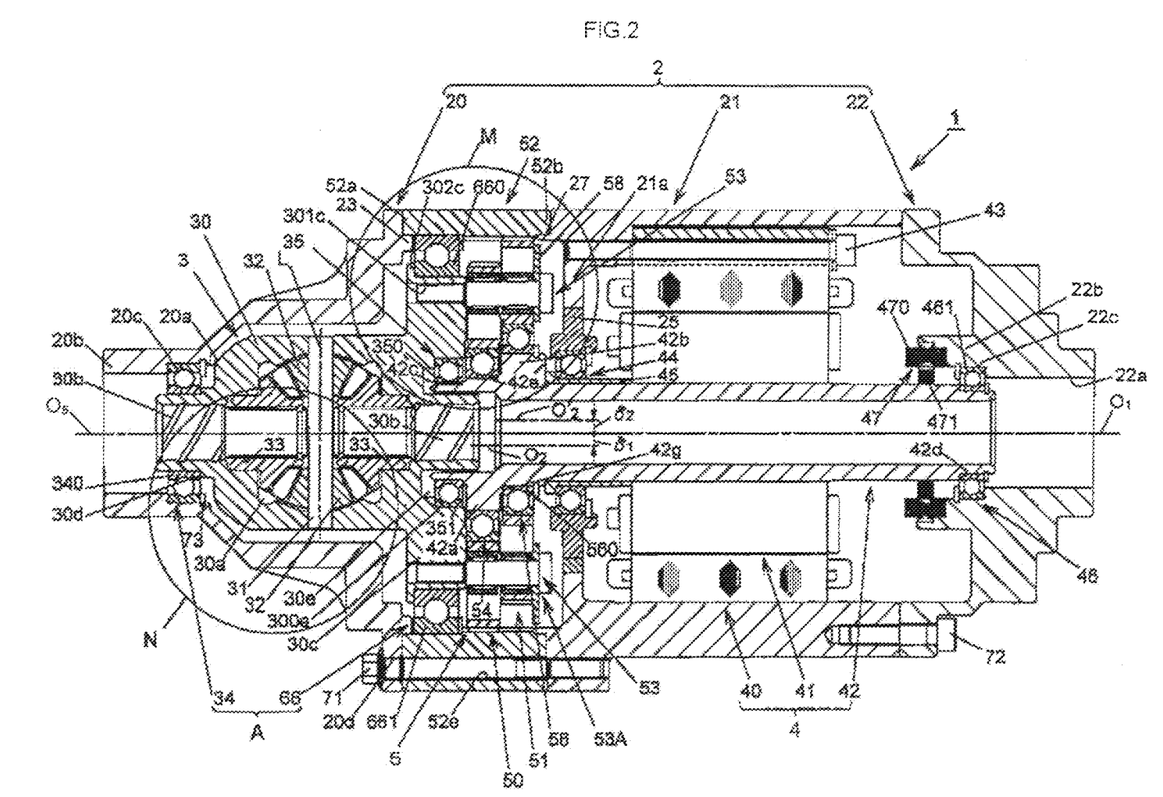
FIG. 2 is a sectional view illustrating the entirety of the motor torque transmission apparatus according to the embodiment of the invention.

FIG. 2 shows the entirety of the motor torque transmission apparatus 1. As shown in FIG. 2, the motor torque transmission apparatus 1 is formed mainly of a housing 2, the rear differential 3, the electric motor 4, and the reduction-transmission mechanism 5. The housing 2 has an axis $O_1$ (first axis) that coincides with the axes of the rear axle shafts 106 (shown in FIG. 1). The rear differential 3 distributes driving force based on motor torque, between the rear wheels 105 (shown in FIG. 1). The electric motor 4 generates motor torque for operating the rear differential 3. The reduction-transmission mechanism 5 reduces the speed of rotation output from the electric motor 4, and transmits the driving force to the rear differential 3.

The housing 2 has a rotation force applying member 52 (described later), and also has a first housing element 20, a second housing element 21, and a third housing element 22. The first housing element 20 accommodates the rear differential 3. The second housing element 21 accommodates the electric motor 4. The third housing element 22 closes a first opening portion of the second housing element 21 (an opening portion on the opposite side of the second housing element 21 from a first housing element 20-side opening portion (second opening portion)). The housing 2 is fitted to the vehicle body.

The first housing element 20 is arranged at a second side (left side in FIG. 2) of the housing 2. Further, the first housing element 20 is fitted, via the rotation force applying member 52 (described later), to the second housing element 21 with a fitting bolt 71. The entirety of the first housing element 20 is formed of a stepped closed-end cylindrical member that is open toward the second housing element 21. The first housing element 20 is made of a material such as aluminum (Al), having a stiffness that is lower than the stiffness of a material of the rotation force applying member 52. Thus, the first housing element 20 is deformable with a deformation amount that is greater than that of the rotation force applying member 52. The bottom of the first housing element 20 has a shaft insertion hole 20a through which one of the rear axle shafts 106 (shown in FIG. 1) is passed, and an inward flange 20b formed at the inner periphery that defines the shaft insertion hole 20a and projected radially inward from the inner periphery. The inward flange 20b has an annular recess 20c that is opened at one of both flange end faces, which is located on the second housing element 21 side, and that is also opened at the inner periphery that defines the shaft insertion hole 20a. An annular protrusion 23 that protrudes toward the second housing element 21 is formed integrally on the open end face of the first housing element 20. The outer periphery of the protrusion 23 has an outer diameter that is smaller than the maximum outer diameter of the first housing element 20, and is formed of a cylindrical surface of which the central axis is an axis $O_4$ (forth axis). A seal member (not shown) is interposed between the inner periphery of the first housing element 20 and the outer periphery of the rear axle shaft 106. The seal member seals the shaft insertion hole 20a. A bolt insertion hole 20d through which the fitting bolt 71 is passed is formed in the first housing element 20. In FIG. 2, the axis $O_4$ is drawn so as to coincide with the axis $O_1$.

The second housing element 21 is arranged at an axially middle portion of the housing 2. The entirety of the second housing element 21 is formed of an open-end cylindrical member that is open toward both sides in the direction of the axis $O_4$. A stepped inward flange 21a, which is interposed between the electric motor 4 and the reduction-transmission mechanism 5, is formed integrally with the second opening portion of the second housing element 21 (the opening portion on the first housing element 20 side). An annular member 25, to which a race is fitted, is fitted to the inner periphery of the inward flange 20a. An annular protrusion 27, which protrudes toward the first housing element 20, is formed integrally on the second open end face of the second housing element 21 (the open end face on the first housing element 20 side). The outer periphery of the protrusion 27 has an outer diameter smaller than the maximum outer diameter of the second housing element 21. The protrusion 27 has substantially the same outer diameter as the outer diameter of the protrusion 23. The outer periphery of the protrusion 27 is formed of a cylindrical surface of which the central axis coincides with the axis $O_4$.

The third housing element 22 is arranged at the first side (right side in FIG. 2) of the housing 2 in the axial direction. Further, third housing element 22 is fitted to the second housing element 21 with a fitting bolt 72. The entirety of the third housing element 22 is formed of a stepped closed-end cylindrical member that is open toward the second housing element 21. The bottom of the third housing element 22 has a shaft insertion hole 22a through which the other one of the rear axle shafts 106 is passed. A cylindrical portion 22b, which protrudes toward the electric motor 4 and to which a stator is fitted, is formed integrally with the third housing element 22 so as to surround the inner opening of the shaft insertion hole 22a. A seal member (not shown) that seals the shaft insertion hole 22a is interposed between the inner periphery of the third housing element 22 and the outer periphery of the rear axle shaft 106. An annular step face 22c that restricts movement of a ball bearing 46 (outer ring 461) in a direction away from the reduction transmission mechanism 5 is formed in the third housing element 22.

The rear differential 3 is formed of a differential case 30, a pinion gear shaft 31, and a bevel gear differential mechanism including a pair of pinion gears 32 and a pair of side gears 33. The rear differential 3 is arranged at the second side of the motor torque transmission apparatus 1.

With this configuration, the torque of the differential case 30 is distributed from the pinion gear shaft 31 to the side gears 33 via the pinion gears 32. The torque of the differential case 30 is further transmitted from the side gears 33 to the right and left rear wheels 105 (shown in FIG. 1) via the rear axle shafts 106 (shown in FIG. 1).

When there arises a difference in driving resistance between the right and left rear wheels 105, the torque of the differential case 30 is differentially distributed to the right and left rear wheels 105 by the rotations of the pinion gears 32.

The differential case 30 is arranged on an axis $O_5$ (fifth axis), and is rotatably supported by the first housing element 20 via a ball bearing 34 and supported by a motor shaft 42 of the electric motor 4 via a ball bearing 35. The differential case 30 is configured to rotate about the axis $O_5$ upon reception of driving force based on the motor torque of the electric motor 4 from the reduction-transmission mechanism 5. The axis $O_5$ is drawn so as to coincide with the axis $O_1$.

The differential case 30 has an accommodation space 30a and a pair of shaft insertion holes 30b. A differential mechanism unit (the pinion gear shaft 31, the pinion gears 32 and the side gears 33) is accommodated in the accommodation space 30a. The shaft insertion holes 30b communicate with the accommodation space 30a, and the right and left rear axle shafts 106 are passed through the shaft insertion holes 30b.

Further, an annular flange 30c that faces the reduction-transmission mechanism 5 (an input member 50) is formed integrally with the differential case 30. An annular step face 30d that restricts movement of the ball bearing 34 (inner ring 340) toward the motor shaft 42 is formed in the second axial end portion of the differential case 30. An annular recess 30e that opens toward the reduction-transmission mechanism 5 is formed in the first axial end portion of the differential case 30.

An annular step face 300e that restricts movement of the ball bearing 35 (outer ring 351) toward the differential case 30 is formed in the recess 30e.

A plurality (six in the present embodiment) of pin fitting holes 30c arranged at equal angular intervals around the axis $O_1$ is formed in the flange 30c. The flange 30c has an annular protrusion 302c that is projected radially outward and that applies an axial load $P=P_2$ (described later) to a ball bearing 66 (inner ring 660) which serves as a second rolling bearing.

The pinion gear shaft 31 is arranged along an axis L that is perpendicular to the axis $O_1$ in the accommodation space 30a of the differential case 30. The rotation of the pinion gear shaft 31 about the axis L and the movement of the pinion gear shaft 31 in the direction of the axis L are restricted by a pin (not shown).

The pinion gears 32 are rotatably supported by the pinion gear shaft 31, and are accommodated in the accommodation space 30a of the differential case 30.

The side gears 33 are accommodated in the accommodation space 30a of the differential case 30, and are coupled, by spline-fitting, to the rear axle shafts 106 passed through the shaft insertion holes 30b (shown in FIG. 1). The side gears 33 are meshed with the pinion gears 32 with their gear axes perpendicular to the gear axes of the pinion gears 32.

The electric motor 4 has a stator 40, a rotor 41, and the motor shaft 42 (motor shaft with eccentric portions). The electric motor 4 is arranged at the first side (the right side in FIG. 2) of the motor torque transmission apparatus 1, and is coupled via the reduction-transmission mechanism 5 to the rear differential 3 on the axis $O_1$. Further, the stator 40 of the electric motor 4 is connected to an electronic control unit (ECU) (not shown). The electric motor 4 is configured such that the stator 40 receives a control signal from the ECU, motor torque for driving the rear differential 3 is generated with the use to the stator 40 and the rotor 41, and the rotor 41 is rotated together with the motor shaft 42.

The stator 40 is arranged at the outer peripheral side of the electric motor 4. Further, the stator 40 is fitted to the inward flange 21a of the second housing element 21 with a fitting bolt 43.

The rotor 41 is arranged at the inner peripheral side of the electric motor 4. Further, the rotor 41 is fitted to the outer periphery of the motor shaft 42.

The second end portion of the motor shaft 42 is rotatably supported by the inner periphery of the annular member 25 via a ball bearing 44 and a sleeve 45, and the first end portion of the motor shaft 42 is rotatably supported by the inner periphery of the third housing element 22 via the ball bearing 46. The entirety of the motor shaft 42 is arranged on the axis $O_1$, and is formed of a cylindrical shaft member through which the rear axle shafts 106 (shown in FIG. 1) are passed.

An annular step face 42c that restricts movement of the ball bearing 35 (inner ring 350) toward the reduction-transmission mechanism 5, is formed in the second axial end portion of the motor shaft 42. Further, an eccentric portion 42a and an eccentric portion 42b, both of which are circular in planar view, are formed integrally with the second end portion of the motor shaft 42. The central axis of the eccentric portion 42a is an axis $O_2$ (second axis) that is offset from the axis of the motor shaft 42 (axis $O_1$) by an eccentric amount $\delta_1$. The central axis of the eccentric portion 42b is an axis $O'_2$ (second axis) that is offset from the axis $O_1$ by an eccentric amount $\delta_2$ ($\delta_1=\delta_2=\delta$). The eccentric portion 42a and the eccentric portion 42b are arranged so as to be next to each other along the axis $O_1$ and apart from each other in the circumferential direction around the axis $O_1$ at equal intervals (180°). That is, the eccentric portion 42a and the eccentric portion 42b are arranged on the outer periphery of the motor shaft 42 such that the distance from the axis $O_2$ to the axis $O_1$ and the distance from the axis $O'_2$ to the axis $O_1$ are equal to each other and the distance between the axis $O_2$ and the axis $O'_2$ in one of the circumferential directions around the axis $O_1$ and the distance between the axis $O_2$ and the axis $O'_2$ in the other circumferential direction around the axis $O_1$ are equal to each other.

A step face 42e that restricts movement of an inner ring 540 of a ball bearing 54 toward the electric motor 4, is formed in the eccentric portion 42a.

Similarly, a step face 42g that restricts movement of an inner ring 560 of a ball bearing 56 toward the rear differential 3, is formed in the eccentric portion 42b.

A resolver 47 that serves as a rotation angle detector is arranged at the first axial end portion of the motor shaft 42, at a position between the outer periphery of the motor shaft 42 and the inner periphery of the cylindrical portion 22b. Further, a step face 42d that restricts movement of the ball bearing 46 (inner ring 460) toward the reduction-transmission mechanism 5 is formed in the first axial end portion of the motor shaft 42. The resolver 47 includes a stator 470 and a rotor 471, and is accommodated in the third housing element 22. The stator 470 is fitted to the inner periphery of the cylindrical portion 22b, and the rotor 471 is fitted to the outer periphery of the motor shaft 42.

Figure 3:
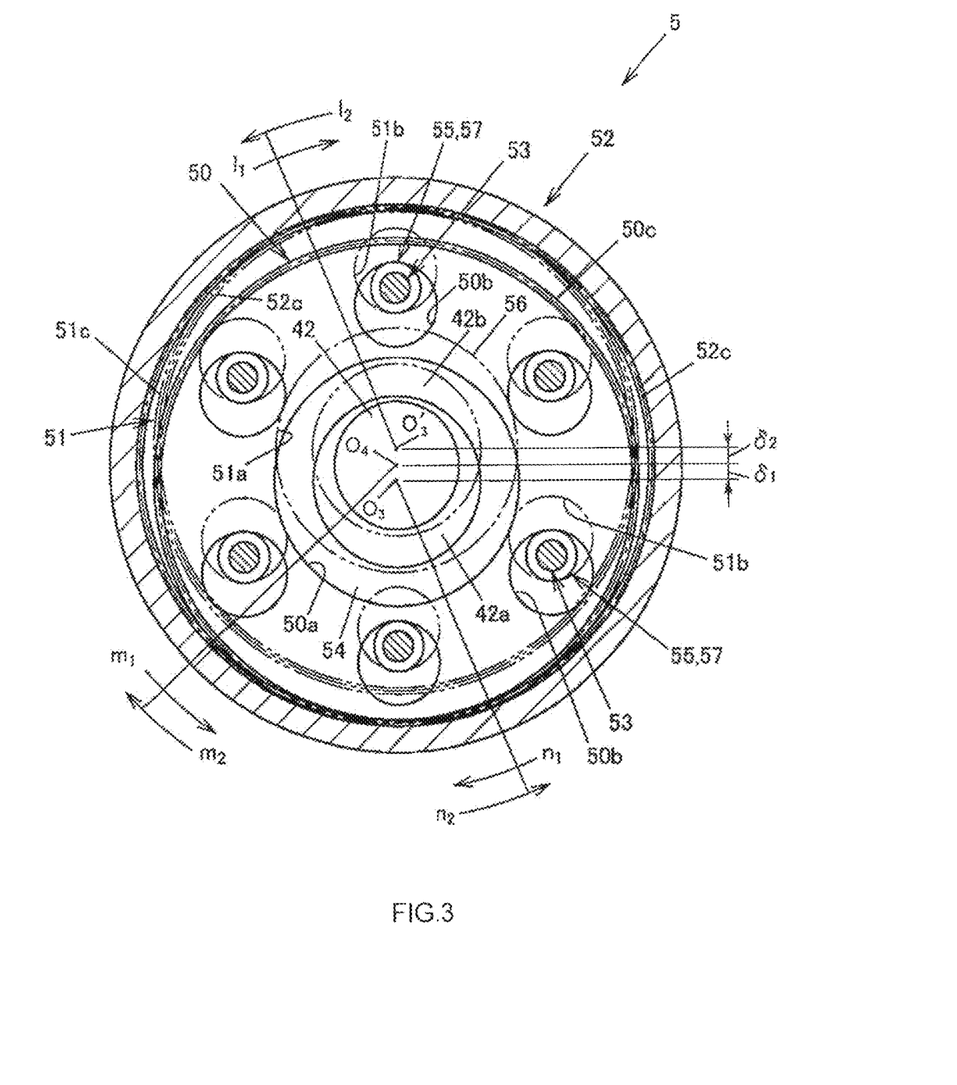
FIG. 3 is a sectional view schematically illustrating a reduction-transmission mechanism of the motor torque transmission apparatus according to the embodiment of the invention.
Figure 4A:
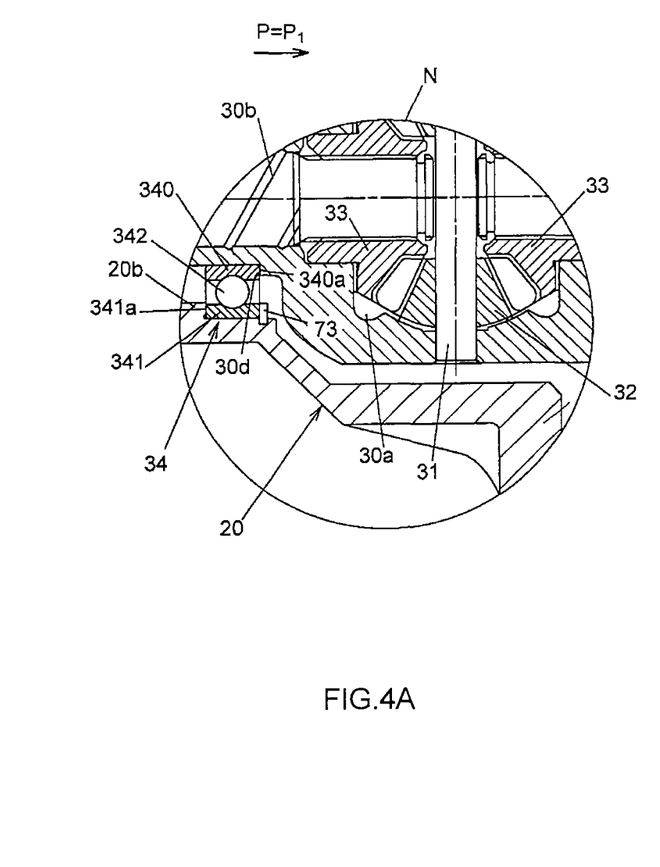
Figure 4B:
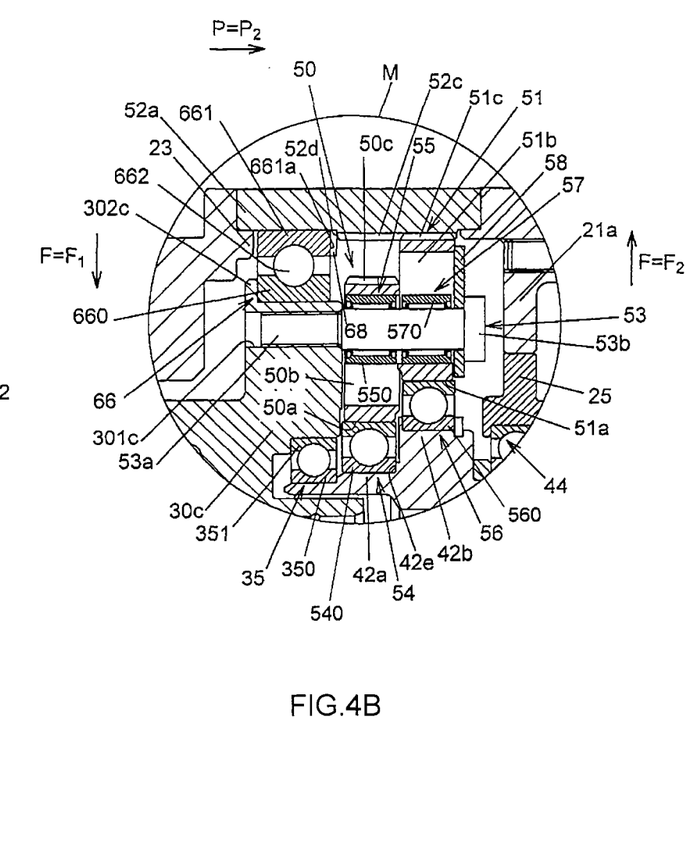

FIG. 3 shows the entirety of the reduction-transmission mechanism. FIG. 4A and FIG. 4B show main portions (bearing mechanism) of the motor torque transmission apparatus. In the present embodiment, the reduction-transmission mechanism is an eccentric oscillation speed reduction mechanism. Further, among various eccentric oscillation speed reduction mechanisms, an involute speed reduction mechanism with a small teeth number difference is used. By using the eccentric oscillation speed reduction mechanism, a higher speed reduction ratio is achieved. As shown in FIG. 2 to FIG. 4B, the reduction-transmission mechanism 5 includes a pair of input members 50, 51, the rotation force applying member 52, an output mechanism 53A (a plurality of output members 53) and a bearing mechanism A (the ball bearings 34, 66 that serve as rolling bearings). The reduction-transmission mechanism 5 is interposed between the rear differential 3 and the electric motor 4. Further, as described above, the reduction-transmission mechanism 5 reduces the rotational speed output from the electric motor 4, and transmits driving force to the rear differential 3.

The input member 50 is an external gear having a center hole 50a of which the central axis is an axis $O_3$ (third axis). The input member 50 is arranged so as to be closer to the rear differential 3 than the input member 51. In addition, the input member 50 is rotatably supported, at its inner periphery that defines the center hole 50a, by the outer periphery of the eccentric portion 42a via the ball bearing 54. The input member 50 is configured to make circular motion (revolving motion about the axis $O_1$) in the directions of arrows $m_1$, $m_2$ with the eccentric amount δ, upon reception of motor torque from the electric motor 4. In FIG. 2 and FIG. 3, the axis $O_3$ is drawn so as to coincide with the axis $O_2$. FIG. 4B shows a state where a centrifugal force $F=F_1$ is applied to the input member 50 and the ball bearing 54.

A plurality (six in the present embodiment) of pin insertion holes (through-holes) 50b is formed in the input member 50 so as to be arranged around the axis $O_3$ (axis $O_2$) at equal angular intervals. Each of the pin insertion holes 50b has a hole diameter that is set to a value greater than the sum of the outer diameter of the output member 53 and the outer diameter of a needle roller bearing 55.

External teeth 50c, having a pitch circle of which the central axis coincides with the axis $O_3$ and having an involute tooth profile, are formed on the outer periphery of the input member 50. The number $Z_1$ of the external teeth 50c is set to, for example, 195 ($Z_1$=195).

The input member 51 is an external gear having a center hole 51a of which the central axis is an axis $O'_3$. The input member 51 is arranged so as to be closer to the electric motor 4 than the input member 50. In addition, the input member 51 is rotatably supported, at its inner periphery that defines the center hole 51a, by the outer periphery of the eccentric portion 42b via the ball bearing 56. The input member 51 is configured to make circular motion (revolving motion about the axis $O_1$) in the directions of the arrows $m_1$, $m_2$ with the eccentric amount δ, upon reception of motor torque from the electric motor 4. In FIG. 2 and FIG. 3, the axis $O'_3$ is drawn so as to coincide with the axis $O'_2$. FIG. 4B shows a state where a centrifugal force $F=F_2$ is applied to the input member 51 and the ball bearing 56.

A plurality (six in the present embodiment) of pin insertion holes (through-holes) 51b is formed in the input member 51 so as to be arranged around the axis $O'_3$ (axis $O'_2$) at equal angular intervals. Each of the pin insertion holes 51b has a hole diameter that is set to a value greater than the sum of the outer diameter of the output member 53 and the outer diameter of a needle roller bearing 57.

External teeth 51c, having a pitch circle of which the central axis coincides with the axis $O'_3$ and having an involute tooth profile, are formed on the outer periphery of the input member 51. The number $Z_2$ of the external teeth 51c is set to, for example, 195 ($Z_2$=195).

The rotation force applying member 52 is formed of an internal gear of which the central axis coincides with an axis $O_4$ (fourth axis). The rotation force applying member 52 is interposed between the first housing element 20 and the second housing element 21. The entirety of the rotation force applying member 52 is formed of an open-end cylindrical member that constitutes part of the housing 2 and that is open toward both sides in the direction of the axis $O_4$. The rotation force applying member 52 is made of, for example, steel. The rotation force applying member 52 is in mesh with the input members 50, 51. The rotation force applying member 52 is configured to apply rotation force in the directions of arrows $n_1$, $n_2$ to the input member 50 that makes revolving motion upon reception of motor torque from the electric motor 4, and to apply rotation force in the directions of arrows $l_1$, $l_2$ to the input member 51 that makes revolving motion upon reception of motor torque from the electric motor 4.

The rotation force applying member 52 has a first fitting portion 52a fitted to the outer periphery of the protrusion 23 and a second fitting portion 52b fitted to the outer periphery of the protrusion 27, and the first fitting portion 52a and the second fitting portion 52b are located at a predetermined distance in the direction of the axis $O_4$. Further, the rotation force applying member 52 has a step face 52d that receives the axial load $P=P_2$ (described later) from the ball bearing 66 (outer ring 661), and a bolt insertion hole 52e through which the fitting bolt 71 is passed.

In addition, the inner periphery of the rotation force applying member 52 has internal teeth 52c having a pitch circle of which the central axis coincides with the axis $O_4$ ($O_1$) and having an involute tooth profile. The internal teeth 52c are in mesh with the external teeth 50c of the input member 50 and the external teeth 51c of the input member 51. The number $Z_3$ of the internal teeth 52c is set to 208 ($Z_3$=208), for example.

Thus, the reduction gear ratio α of the reduction-transmission mechanism 5 is calculated according to an equation, $\alpha = Z_2/(Z_3-Z_2)$.

The output mechanism 53A is formed of a plurality (six in the present embodiment) of the output members 53, is interposed between the rear differential 3 and the electric motor 4, and is accommodated in the housing 2.

Each of the output members 53 has a threaded portion 53a at one end and a head 53b at the other end. The threaded portions 53a of the output members 53 are passed through the pin insertion holes 50b of the input member 50 and the pin insertion holes 51b of the input member 51 and then fitted in the pin fitting holes 301c of the flange 30c of the differential case 30. In addition, the output members 53 are passed through an annular spacer 58 that is interposed between each head 53b and the input member 51, and arranged around the axis $O_1$ at equal angular intervals. The output members 53 are configured to receive rotation force, applied by the rotation force applying member 52, from the input members 50, 51, and then output the rotation force to the differential case 30 as the torque of the differential case 30. Thread members (bolts) having threaded portions 53a that are screwed into the respective pin fitting holes 301c of the flange 30c, are used as the output members 53.

The needle roller bearing 55 is fitted to the outer periphery of each output member 53 at a portion between the threaded portion 53a and the head 53b. The needle roller bearing 55 is used to reduce contact resistance between each output member 53 and the inner periphery of the input member 50, which defines the corresponding pin insertion hole 50b. In addition, the needle roller bearing 57 is fitted to the outer periphery of each output member 53 at a portion between the threaded portion 53a and the head 53b. The needle roller bearing 57 is used to reduce contact resistance between each output member 53 and the inner periphery of the input member 51, which defines the corresponding pin insertion hole 51b.

As shown in FIG. 4A and FIG. 4B, the bearing mechanism A includes the ball bearing 34 (refer to FIG. 4A) and the ball bearing 66 (refer to FIG. 4B) that are arranged in parallel with each other in the axial direction of the differential case 30, and is provided on the axis (axis $O_1$) of the output mechanism 53A.

The ball bearing 34 includes two bearing rings 340, 341 (an inner ring 340 and an outer ring 341) that are arranged in parallel with each other such that the outer ring 341 is located radially outward of the inner ring 340, and rolling elements 342 that roll between the inner ring 340 and the outer ring 341. The ball bearing 34 is interposed between a recess surface of the recess 20c of the inward flange 20b, which is located on the reduction-transmission mechanism 5 side, (the inner periphery of the first housing element 20) and the outer periphery of the second axial end portion of the differential case 30. Further, the ball bearing 34 supports the end portion of the differential case 30, which is on the opposite side of the differential case 30 from the electric motor 4, (the end portion which is on the opposite side of the differential case 30 from the motor side end portion) such that the end portion of the differential case 30 is rotatable relative to the inner periphery of the first housing element 20.

The inner ring 340 is fitted, for example, by interference fit, to the outer periphery of the differential case 30 such that a first side (electric motor 4 side) end face 340a thereof is in contact with the step face 30d of the differential case 30.

The outer ring 341 is fitted to the inner periphery of the first housing element 20, for example, by clearance fit such that a second side end face 341a thereof is in contact with the inward flange 20b of the first housing element 20 and a first side end face 341b is in contact with a snap ring 73. The snap ring 73 is fitted to the first housing element 20 so as to project from the inner periphery (the recess surface of the recess 20c) of the first housing element 20. When the first housing element 20 is fixed (fastened) to the rotation force applying member 52 (the second housing element 21) with the fitting bolt 71 (refer to FIG. 2), an axial load $P=P_1$ is applied, as a preload, to the outer ring 341 in a direction from the inward flange 20b toward the electric motor 4.

The rolling elements 342 are interposed between the inner ring 340 and the outer ring 341, and are rollably held by a cage (not shown).

Similarly, the ball bearing 66 includes two bearing rings 660, 661 (an inner ring 660 and an outer ring 661) that are arranged in parallel with each other such that the outer ring 661 is located radially outward of the inner ring 660, and rolling elements 662 that roll between the inner ring 660 and the outer ring 661. The ball bearing 66 is arranged on the rear differential 3 side of the reduction-transmission mechanism 5, and is interposed between the outer periphery of the flange 30c and the inner periphery of the rotation force applying member 52 (first fitting portion 52a). Further, the ball bearing 66 supports the motor side end portion (flange 30c) of the differential case 30 such that the end portion is rotatable relative to the inner periphery of the first housing element 20.

The inner ring 660 is fitted to the outer periphery of the flange 30c, for example, by snug fit, such that a second side (rear differential 3 side) end face 660a is in contact with the protrusion 302c of the flange 30c. When the output members 53 are fitted in the pin fitting holes 301c of the flange 30c, the axial load $P=P_2$ is applied, as a preload, to the inner ring 660 in a direction from the protrusion 302c of the flange 30c toward the electric motor 4.

The outer ring 661 is fitted to the inner periphery of the first fitting portion 52a by clearance fit such that a first side (electric motor 4 side) end face 661a is in contact with the rear differential-side end face 52d of the rotation force applying member 52 (spacer 68). The spacer 68 is arranged radially outward of the flange 30c so as to be interposed between the first side end face 661a of the outer ring 661 and the rear differential side end face 52d of the rotation force applying member 52.

The rolling elements 662 are arranged between the inner ring 660 and the outer ring 661, and are rollably held by a cage (not shown).

In the motor torque transmission apparatus 1 configured as described above, if a load that hinders rotation of the differential case 30 is exerted on the differential case 30 on the basis of the centrifugal forces $F=F_1, F_2$ that are induced in the input members 50, 51 as the motor shaft 42 is rotated, the differential case 30 is moved in a direction in which the load is exerted. In this case, a moving force of the differential case 30 is exerted on the first housing element 20 from the end portion of the differential case 30, which is on the opposite side of the differential case 30 from the electric motor 4 (which is on the opposite side of the differential case 30 from the rotation force applying member 52), via the ball bearing 34, and accordingly, the first housing element 20 is elastically deformed. In the meantime, the moving force of the differential case 30 is also exerted on the rotation force applying member 52 from the motor side (rotation force applying member 52 side) end portion of the differential case 30 via the ball bearing 66. However, the rotation force applying member 52 is not elastically deformed. Even if the rotation force applying member 52 is elastically deformed, the amount of the deformation is smaller than the amount of deformation of the first housing element 20. This is because the stiffness of the material of the first housing element 20 is smaller than that of the rotation force applying member 52, and therefore, the first housing element 20 by which the end portion of the differential case 30 that receives the load based on the centrifugal forces $F=F_1, F_2$, the end portion being on the opposite side of the differential case 30 from the electric motor 4, is supported via the ball bearing 34, is deformed more easily than the rotation force applying member 52 by which the differential case 30 is supported via the ball bearing 66. Therefore, the motor side end portion of the differential case 30 is supported by the inner periphery of the rotation force applying member 52, which is rigid, via the ball bearing 66, and, as a result, it is possible to suppress occurrence of off-center between the differential case 30 and the rotation force applying member 52.

Next, an operation of the motor torque transmission apparatus according to the embodiment will be described with reference to FIG. 1 to FIG. 3.

Referring to FIG. 2, when the electric motor 4 is driven by supplying electric power to the electric motor 4 in the motor torque transmission apparatus 1, motor torque of the electric motor 4 is applied to the reduction-transmission mechanism 5 via the motor shaft 42, and thus, the reduction-transmission mechanism 5 is operated.

Thus, the input members 50, 51 of the reduction-transmission mechanism 5 make circular motions with the eccentric amount δ, for example, in the direction indicated by the arrow $m_1$ shown in FIG. 3.

Accordingly, the input member 50 rotates about the axis $O_2$ (the direction of the arrow $n_1$ shown in FIG. 3) while the external teeth 50c are meshed with the internal teeth 52c of the rotation force applying member 52. In addition, the input member 51 rotates about the axis $O'_2$ (the direction of the arrow shown in FIG. 3) while the external teeth 51c are meshed with the internal teeth 52c of the rotation force applying member 52. In this case, due to the rotation of the input members 50, 51, the inner peripheries of the input member 50, which define the pin insertion holes 50b, contact races 550 of the needle roller bearings 55, and the inner peripheries of the input member 51, which define the pin insertion holes 51b, contact races 570 of the needle roller bearings 57.

Therefore, the revolving motions of the input members 50, 51 are not transmitted to the output members 53 and only the rotating motions of the input members 50, 51 are transmitted to the output members 53. Rotation force resulting from the rotating motions is output via the output members 53 to the differential case 30 as the torque of the differential case 30.

In this way, the rear differential 3 is actuated, and driving force based on the motor torque of the electric motor 4 is distributed to the rear axle shafts 106 shown in FIG. 1, and transmitted to the right and left rear wheels 105.

In the embodiment described above, the input members 50, 51 are caused to make circular motions in the direction indicated by the arrow $m_1$ to operate the motor torque transmission apparatus 1. However, even if the input members 50, 51 are caused to make circular motions in the direction indicated by the arrow $m_2$, the motor torque transmission apparatus 1 is operated as in the embodiment described above. In this case, the input member 50 makes circular motion in the direction indicated by the arrow $n_2$, and the input member 51 makes circular motion in the direction indicated by the arrow $I_2$.

According to the embodiment as described above, the following advantageous effects are obtained.

(1) The motor side end portion of the differential case 30 is supported by the inner periphery of the rotation force applying member 52 via the ball bearing 66 and the end portion of the differential case 30, which is on the opposite side of the differential case 30 from the electric motor 4, is supported by the inner periphery of the first housing element 20 via the ball bearing 34. Thus, the coaxiality between the differential case 30 and the rotation force applying member 52 is improved. That is, occurrence of off-center between the differential case 30 and the rotation force applying member 52 is suppressed, and, as a result, the input members 50, 51 are appropriately meshed with the rotation force applying member 52.

(2) The rotation force applying member 52 is formed of the cylindrical member that constitutes part of the housing 2. Thus, the outer diameter of the rotation force applying member 52 is set to a value larger than that in the case where the rotation force applying member 52 is accommodated within the housing 2. As a result, the rotation force applying member 52 has a higher mechanical strength. Because the rotation force applying member 52 constitutes part of the housing 2, the dimensions of the whole apparatus in the radial direction are reduced, which makes it possible to reduce the size of the apparatus.

(3) The first fitting portion 52a of the rotation force applying member 52 is fitted to the outer periphery of the protrusion 23 and the second fitting portion 52b of the rotation force applying member 52 is fitted to the outer periphery of the protrusion 27 to carry out centering. Thus, it is possible to facilitate a process for manufacturing the rotation force applying member 52.

As described above, the speed reduction mechanism according to the invention and the motor torque transmission apparatus that includes the speed reduction mechanism are described on the basis of the above embodiment. However, the invention is not limited to the above embodiment. The invention may be implemented in various other embodiments without departing from the scope of the invention. For example, the following modifications may be made.

(1) In the above-described embodiment, the eccentric portion 42a and the eccentric portion 42b are arranged on the outer periphery of the motor shaft 42 such that the distance from the axis $O_2$ to the axis $O_1$ and the distance from the axis $O'_2$ to the axis $O_1$ are equal to each other and the distance between the axis $O_2$ and the axis $O'_2$ in one of the circumferential directions around the axis $O_1$ and the distance between the axis $O_2$ and the axis $O'_2$ in the other circumferential direction around the axis $O_1$ are equal to each other, and the pair of input members 50, 51 are arranged on the portions that are formed on the motor shaft 42 of the electric motor 4 so as to be apart from each other in the circumferential direction around the axis $O_1$ at equal intervals (180°). However, the invention is not limited to this configuration, and the number of the input members may be appropriately changed.

That is, when the number of the input members is n (n≥3), the axis of the first eccentric portion, the axis of the second eccentric portion, ..., and the axis of the nth eccentric portion are sequentially arranged in one direction around the axis of the motor shaft, on an imaginary plane perpendicular to the axis of the electric motor (motor shaft). Then, the eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion, ..., and the nth eccentric portion is set to 360°/n. Furthermore, the n input members are arranged on the motor shaft at portions that are apart from each other at intervals of 360°/n around the axis $O_1$.

For example, when the number of the input members is three, the axis of the first eccentric portion, the axis of the second eccentric portion and the axis of the third eccentric portion are sequentially arranged in one direction around the axis of the motor shaft, on an imaginary plane perpendicular to the axis of the motor shaft. The eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion and the third eccentric portion is set to 120°. Furthermore, the three input members are arranged on the motor shaft at portions that are apart from each other at intervals of 120° around the axis of the motor shaft.

(2) In the above-described embodiment, the description is made on the case where the invention is applied to the four-wheel-drive vehicle 101 that uses the engine 102 and the electric motor 4 as the driving sources. However, the invention is not limited to this configuration. The invention may also be applied to an electric vehicle, which is a four-wheel drive vehicle or a two-wheel-drive vehicle, using only an electric motor as a driving source. In addition, the invention may also be applied to a four-wheel-drive vehicle having first drive shafts that are driven by an engine and an electric motor and second drive shafts that are driven by an electric motor as in the case of the above-described embodiment.

(3) In the embodiment described above, the ball bearing 34, which is a deep groove ball bearing, is provided between the outer periphery of the end portion of the differential case 30, which is on the opposite side of the differential case 30 from the electric motor 4, and the inner periphery of the first housing element 20, and the ball bearing 66, which is a deep groove ball bearing, is provided between the outer periphery of the motor side end portion of the differential case 30 and the inner periphery of the rotation force applying member 52. However, the invention is not limited to this configuration, and roller bearings or ball bearings other than deep groove ball bearings may be used instead of the deep groove ball bearings. Such a ball bearing or a roller bearing may be, for example, an angular contact ball bearing, a needle roller bearing, a long cylindrical roller bearing, a cylindrical roller bearing, a tapered roller bearing, a spherical roller bearing, or the like.

(4) In the above-described embodiment, the inner ring 340 of the ball bearing 34 is fitted to the outer periphery of the differential case 30 by interference fit, and the inner ring 660 of the ball bearing 66 is fitted to the outer periphery of the differential case 30 (flange 30c) by snug fit. However, the invention is not limited to this configuration, and the inner ring or the outer ring may be fitted to the corresponding periphery by any one of interference fit, clearance fit and snug fit.

Figure 5:
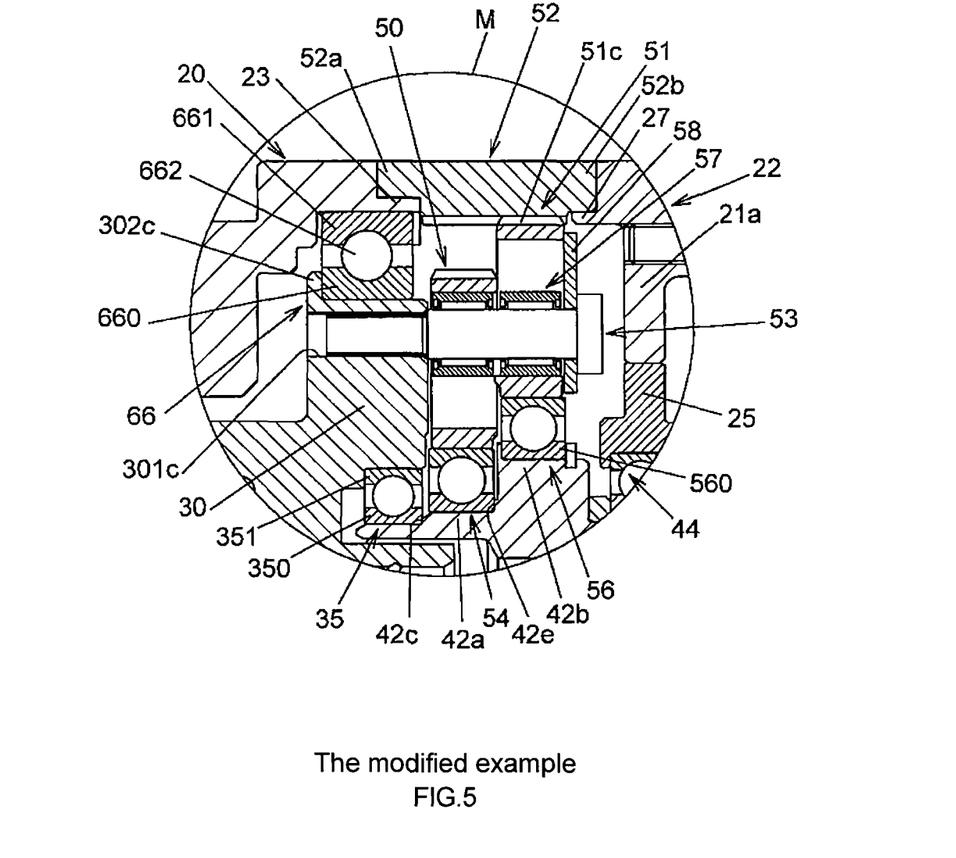
FIG. 5 is a sectional view illustrating main portions of the motor torque transmission according to a modified example of the embodiment of the invention.

(5) In the embodiment described above, the ball bearing 66 supports the motor side end portion of the differential case 30 with the entire outer periphery of the outer ring 661 facing the inner periphery of the rotation force applying member 52. However the invention is not limited to this configuration. As shown in FIG. 5, the ball bearing 66 may support the motor side end portion of the differential case 30 with part of the outer periphery of the outer ring 661 (the outer periphery of the protrusion 23 of the first housing element 20) facing the inner periphery of the rotation force applying member 52 (first fitting portion 52a). Further, the rolling bearing (ball bearing 66) may support an output target (differential case 30) with the outer periphery of its outer ring facing (contacting) the inner peripheries of both the housing (first housing element 20) and the rotation force applying member 52. In short, the invention may be applied to the configuration in which the rolling bearing (one of the rolling bearings), which is arranged on the opposite side of the differential case from the motor, and the rolling bearing (the other one of the rolling bearings), which is arranged on the motor side, are provided, and the other one of the rolling bearings supports the output target with at least part of its outer periphery facing the inner periphery of the rotation force applying member.

According to the invention, it is possible to suppress occurrence of off-center between the rotation force applying member and the output target.

What is claimed is:
1. A speed reduction mechanism, comprising:
a rotary shaft with an eccentric portion;
an input member that is an external gear rotatably arranged on an outer periphery of the eccentric portion of the rotary shaft and having a plurality of through-holes arranged around an axis of the input member at equal angular intervals;
a rotation force applying member that is an internal gear meshed with the input member and having teeth of which the number is larger than the number of teeth of the external gear;
an output mechanism having plurality of output members that receive rotation force applied to the input member by the rotation force applying member and output the rotation farce to an output target as torque of the output target, and that are passed through the respective through-holes; and
a bearing mechanism arranged on an axis of the output mechanism and including a first rolling bearing and a second rolling bearing that are arranged in parallel with each other in an axial direction of the output target, wherein
the output target is rotatably supported by the first and second rolling bearings of the bearing such that an outer periphery of the first rolling bearing faces an inner periphery of a housing that accommodates the output target, the housing being made of a material having a stiffness lower than a stiffness of a material of the rotation force applying member, and an entirety of an outer periphery of the second rolling bearing contacts an inner periphery of the rotation force applying member, wherein
a first axial side face of the second rolling bearing is in contact with a step face of the rotation force applying member and a second axial side face of the second rolling bearing faces a protrusion of the housing that supports the rotation force applying member.

2. The speed reduction mechanism according to claim 1, wherein the output target is rotatably supported on the inner periphery of the rotation force applying member via an end portion of the housing, by the second rolling bearing of the bearing mechanism.

3. The speed reduction mechanism according to claim 2, wherein the one of the first and second rolling bearings of the bearing mechanism receives an axial load as a preload when the housing is fitted to the rotation force applying member, and the other one of the first and second rolling bearings receives an axial load as a preload when the members are fitted to the output target.

4. A motor torque transmission apparatus, comprising:
an electric motor that generates motor torque; and
a speed reduction mechanism that reduces a speed of rotation output from the electric motor and outputs driving force, wherein the speed reduction mechanism is the speed reduction mechanism according to claim 3.

5. A motor torque transmission apparatus, comprising:

an electric motor that generates motor torque; and a speed reduction mechanism that reduces a speed of rotation output from the electric motor and outputs driving force, wherein the speed reduction mechanism is the speed reduction mechanism according to claim 2.

6. The speed reduction mechanism according to claim 1, wherein the one of the first and second rolling bearings of the bearing mechanism receives an axial load as a preload when the housing is fitted to the rotation force applying member, and the other one of the first and second rolling hearings receives an axial load as a preload when the output members are fitted to the output target.

7. A motor torque transmission apparatus, comprising:

an electric motor that generates motor torque; and a speed reduction mechanism that reduces a speed of rotation output from the electric motor and outputs driving force, wherein the speed reduction mechanism is the speed reduction mechanism according to claim 6.

8. A motor torque transmission apparatus, comprising:

an electric motor that generates motor torque, and a speed reduction mechanism that reduces a speed of rotation output from the electric motor and outputs driving force, wherein the speed reduction mechanism is the speed reduction mechanism according to claim 1.

9. The speed reduction mechanism according to claim 1, wherein a first axial side face of the first rolling bearing is in contact With a snap ring that projects from the inner periphery of the housing and a second axial side face of the first rolling bearing is in contact with a flange of the housing.

\* \* \* \* \*